United States Patent
Bartlett et al.

(10) Patent No.: US 7,162,998 B1
(45) Date of Patent: Jan. 16, 2007

(54) METHOD OF STARTING AN INTERNAL COMBUSTION ENGINE FOR STRONG HYBRID POWERTRAINS

(75) Inventors: Richard Lewis Bartlett, Novi, MI (US); Lyle E. Hamilton, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/362,679

(22) Filed: Feb. 27, 2006

(51) Int. Cl.
*F02D 1/00* (2006.01)
*F02P 5/00* (2006.01)

(52) U.S. Cl. .............. 123/339.11; 123/406.11

(58) Field of Classification Search ........... 123/339.11, 123/350, 406.11, 406.16, 406.23; 73/116, 73/117.2, 117.3
See application file for complete search history.

(56) References Cited

U.S. PATENT DOCUMENTS 7,104,347 B1 * 9/2006 Severinsky et al. ........ 180/65.2
2005/0256618 A1 * 11/2005 Hsieh et al. .................. 701/22

\* cited by examiner

*Primary Examiner*—John T. Kwon
(74) *Attorney, Agent, or Firm*—Christopher DeVries

(57) ABSTRACT

A control system for a vehicle includes a combustion engine and an electric propulsion system. The combustion engine includes a camshaft and a crankshaft. The control system improves NVH by deactivating the compression pulses during a cranking phase of the combustion engine. A first control module generates a minimum torque, a second control module generates an actual torque and a third control module generates a reference torque. A timing control module generates a timing control output based on the minimum torque, the actual torque and the reference torque. The minimum torque is based on an RPM of the combustion engine, a spark angle and an air per cylinder of the combustion engine. The actual torque is based on an RPM of the combustion engine, a spark angle and an air per cylinder. The reference torque is based on an output of a pedal position sensor.

8 Claims, 4 Drawing Sheets

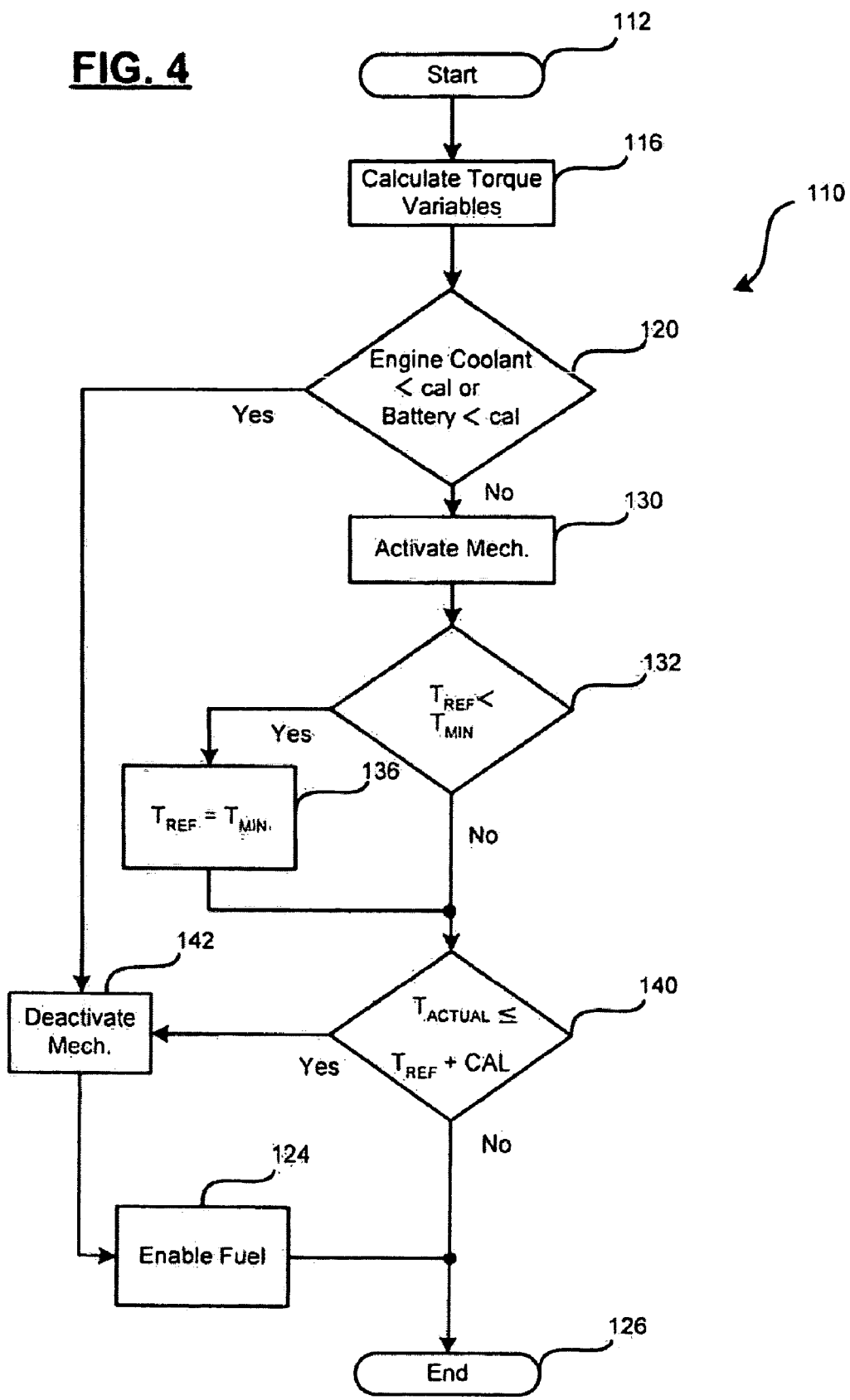

METHOD OF STARTING AN INTERNAL COMBUSTION ENGINE FOR STRONG HYBRID POWERTRAINS

FIELD OF THE INVENTION

The present invention relates to vehicle control systems in hybrid vehicles, and more particularly to vehicle control systems for minimizing powertrain forces transmitted to the vehicle chassis during startup of an internal combustion engine.

BACKGROUND OF THE INVENTION

Hybrid powertrains make use of two (or more) propulsion systems to propel the vehicle. The primary device is typically an internal combustion engine and the secondary device is typically an electric motor and battery system. The secondary system is usually capable of utilizing energy from storage batteries to provide tractive energy to wheels and provide energy to start the primary device. Additionally, the secondary system is usually capable of absorbing tractive energy from the wheels, such as during a braking event, to charge the storage batteries.

As a result of this architecture, the combustion engine is frequently turned on and off many times during normal operation of the vehicle. The frequent start events present a significant challenge in terms of meeting the product requirements for noise, vibration and harshness (NVH). Of particular concern are the forces applied from the powertrain through the chassis during engine compression events that are the natural result from engines operating the Otto (four-stroke) cycle. These forces occur during both firing and non-firing modes of operation.

SUMMARY OF THE INVENTION

A control system for a vehicle includes a combustion engine and an electric propulsion system. The combustion engine includes a camshaft and a crankshaft. A first control module generates a minimum torque, a second control module generates an actual torque and a third control module generates a reference torque. A timing control module generates a timing control output based on the minimum torque, the actual torque and the reference torque.

According to other features, the minimum torque is based on an RPM of the combustion engine, a spark angle and an air per cylinder of the combustion engine. The actual torque is based on an RPM of the combustion engine, a spark angle and an air per cylinder of the combustion engine. The reference torque is based on an output of a pedal position sensor communicating with the control module of the vehicle.

According to yet other features, the control module compares the actual torque to the reference torque and enables fuel to the combustion engine based on the comparison. A timing mechanism is connected to the camshaft. The control system activates the timing mechanism to operate the camshaft at a substantially equal speed of the crankshaft. The control module deactivates the timing mechanism based on the actual output torque being less than the reference torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a flowchart illustrating steps of reducing HVH during engine start events for a hybrid vehicle according to some implementations of the present invention.

DETAILED DESCRIPTION OF THE PREFERRED EMBODIMENTS

The following description of the preferred embodiment is merely exemplary in nature and is in no way intended to limit the invention, its application, or uses. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
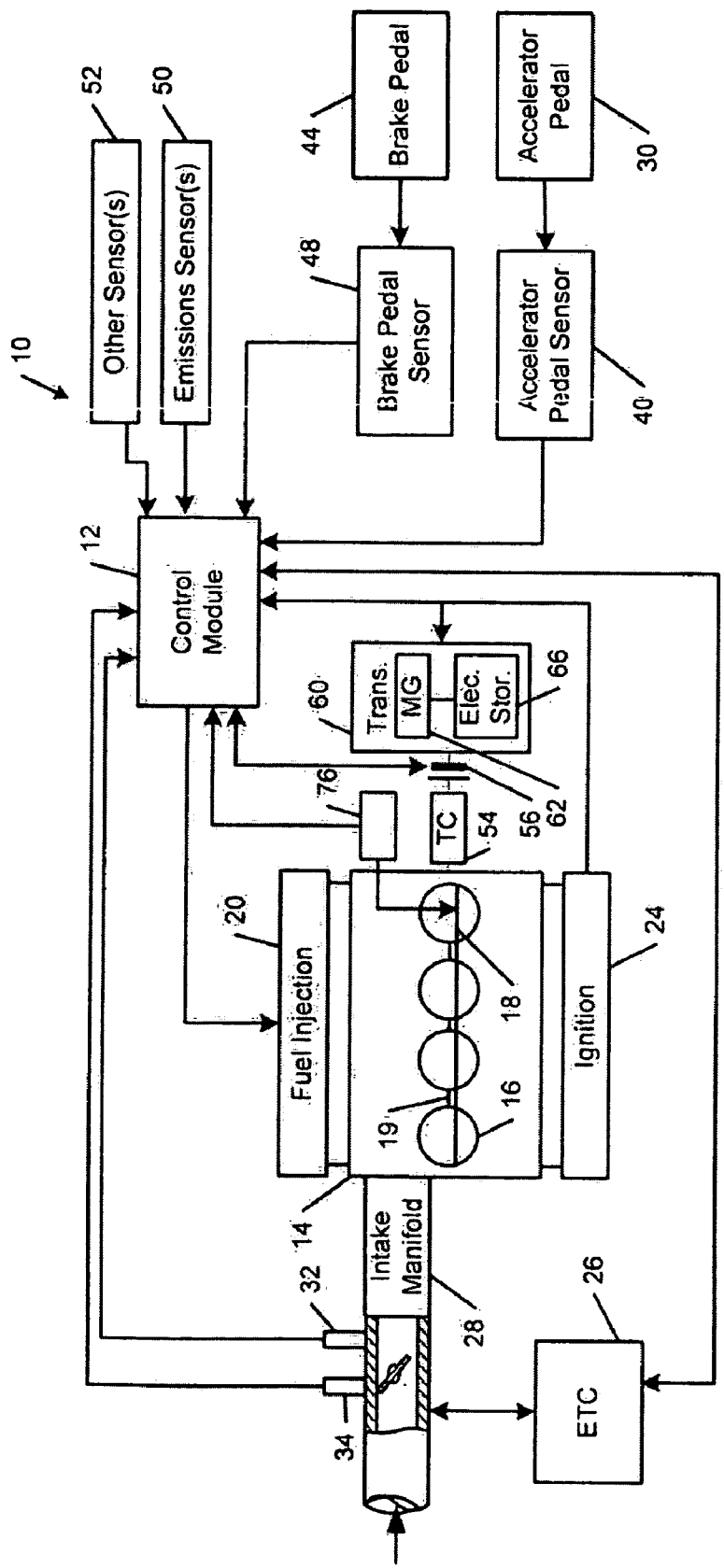
FIG. 1 is a functional block diagram of a control system that reduces NVH during engine start events for a hybrid vehicle according to some implementations of the present invention.

Referring now to FIG. 1, an engine control system 10 according to the present invention includes a control module 12 and an engine 14. The engine 14 includes a plurality of cylinders 16 each with one or more intake valves and/or exhaust valves (not shown). The intake valves and/or exhaust valves are opened and closed by a camshaft 18. The cylinders 16 are connected to a crankshaft 19 through connecting rods (not shown) to transfer linear motion of the cylinders 16 into rotary motion of the crankshaft 19.

The engine 14 further includes a fuel injection system 20 and an ignition system 24. An electronic throttle control module (ETC) 26 adjusts a throttle area in an intake manifold 28 based upon a position of an accelerator pedal 30 and a throttle control algorithm that is executed by the control module 12. It will be appreciated that ETC 26 and control module 12 may include one or more control modules. One or more sensors, such as a manifold pressure sensor (MAP) 32 and/or a manifold air temperature sensor, 34, sense pressure and/or air temperature in the intake manifold 28.

A position of the accelerator pedal 30 is sensed by an accelerator pedal sensor 40, which generates a pedal position signal that is output to the control module 12. A position of a brake pedal 44 is sensed by a brake pedal sensor 48, which generates a brake pedal position signal that is output to the control module 12. Emissions system sensors 50 and other sensors 52 such as a temperature sensor, a barometric pressure sensor, and other conventional sensor and/or control module signals are used by the control module 12 to control the engine 14.

An output shaft of the engine 14 is coupled by a torque converter 54 and transmission forward clutch 56 to a transmission 60 which drives front and/or rear wheels. The transmission 60 may be a continually variable transmission or alternatively a conventional transmission. The transmission forward clutch 56 is preferably engaged with hydraulic fluid supplied by an electro-hydraulic control module (not shown) under control of the control module 12 depending on the operating conditions. The transmission forward clutch 56 couples the engine 14 to the transmission 60 when the vehicle is moving and can disconnect the engine 14 from the transmission 60 when the vehicle is at rest. When the control module 12 determines that an engine restart is necessary, the motor generator 62 is rotated causing the engine 14 to be rotated at a speed sufficient to cause starting thereof.

The control module 12 communicates with a motor generator 62 that is coupled to the transmission 60 using a chain drive, a clutch system, a planetary gear set, or any other device. The vehicle can be driven in forward and reverse directions either by the engine 14, the motor generator 62 or a combination of both. During vehicle braking, the motor generator 62 may be driven as a generator to charge a complement of electrical storage members 66. The vehicle uses electro-dynamic braking as well as conventional friction braking. The electrical storage members 66 supply power to the motor generator 62 when it is operated as a motor. The motor generator 62 can also be driven as a generator during normal vehicle operation to maintain a predetermined charge at the electrical storage members 66.

The control module 12 according to an embodiment of the present invention communicates with a timing mechanism 76 to modify the speed of the camshaft 18. More specifically, activation of the timing mechanism 76 causes the camshaft 18 to rotate at substantially the same speed as the crankshaft 19. In the exemplary implementation, the camshaft 18 is rotated at two times normal speed, or at substantially the same speed as the crankshaft 19. The timing mechanism 76 may cooperate with a timing chain (not specifically shown) of the camshaft 18. The timing mechanism 76 may include a planetary gear set, a clutch mechanism, an electronic valve actuator or any other mechanism configured to modify rotation of the camshaft 18 relative to the crankshaft 19.

By rotating the camshaft 18 at the same speed as the crankshaft 19, the compression cycle in the engine 14 is effectively eliminated. As a result, the forces transmitted into the vehicle chassis resulting from the compression cycle during engine operation are greatly reduced improving NVH as a whole. The control module 12 utilizes the motor generator 62 to power the vehicle during a vehicle launch event. Furthermore, as a result of operating the camshaft at two times normal speed, the airflow pumping efficiency of the engine 14 is improved, thus facilitating a rapid decrease in MAP. To fully appreciate the advantages of rotating the camshaft 18 at the same speed as the crankshaft 19, a brief discussion of the Otto four-stroke cycle is warranted.

Figure 2:
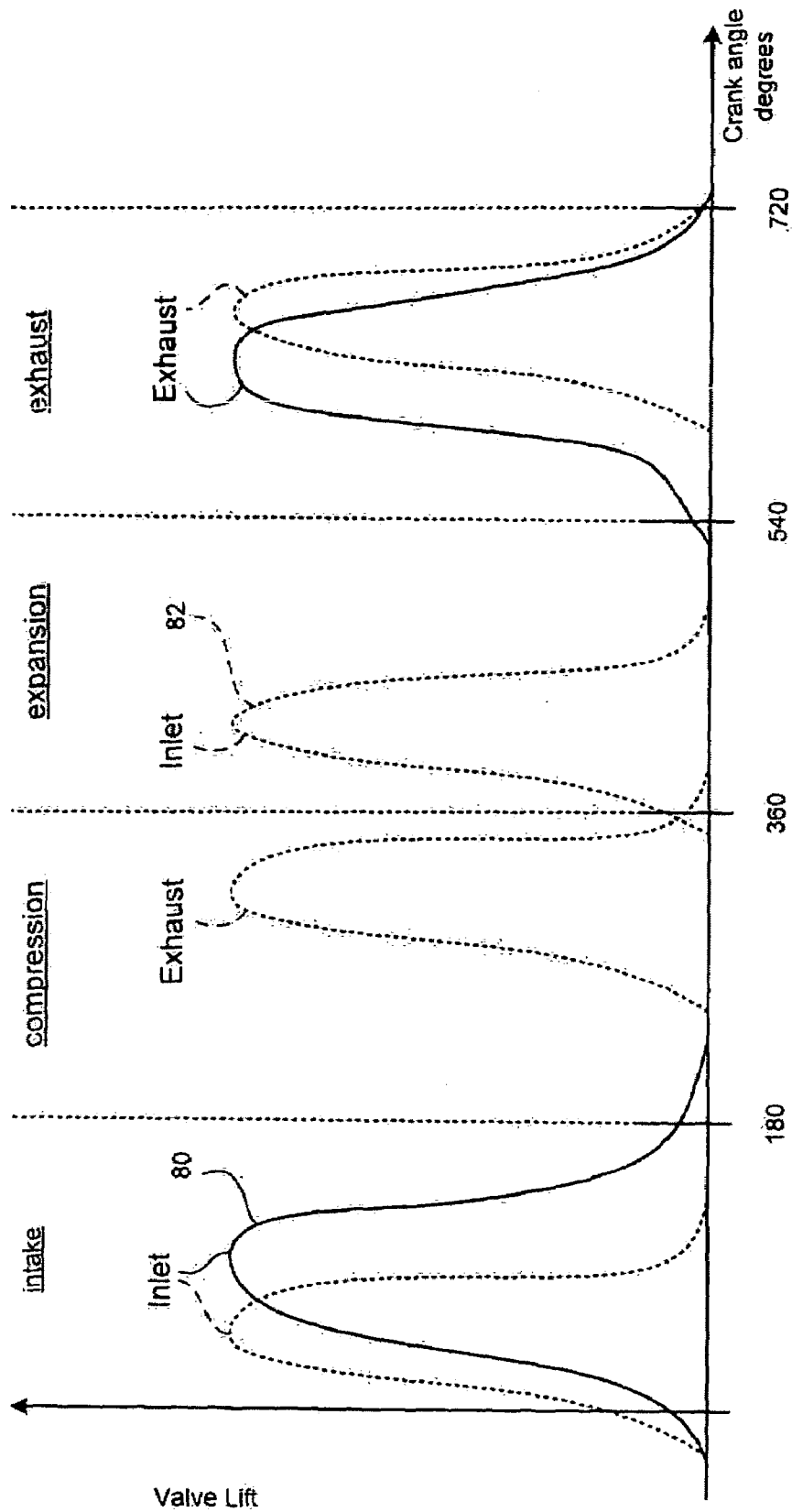
FIG. 2. is a graph depicting valve lift versus crank angle for an engine operating the four-stroke cycle and an engine operating with a camshaft at crankshaft speed to defeat the compression cycle according to some implementations of the present invention.

FIG. 2 is a graph illustrating valve lift versus crank angle for a conventional engine (depicted as 80) and an engine incorporating the timing mechanism 76 (depicted as 82). In general, it takes four full strokes of a cylinder 16 to complete one Otto cycle. For purposes of this discussion, a piston stroke is defined as its travel from top dead center (TDC) to bottom dead center (BDC), or (BDC) to (TDC). There are two strokes per 360 degree revolution of the crankshaft 19. It takes 720 degrees of rotation of the crankshaft 19 to complete one four-stroke cycle.

During normal operation of the engine 14, the camshaft 18 provides one intake stroke and one exhaust stroke for one Otto cycle. As shown, operating the camshaft 18 at two times normal speed improves the pumping effort by making use of two intake and exhaust strokes during the complete four-stroke cycle. More specifically, the pressure of the intake manifold 28 is pumped down while operating the timing mechanism 76 and utilizing the electric propulsion system (motor generator 62).

Figure 3:
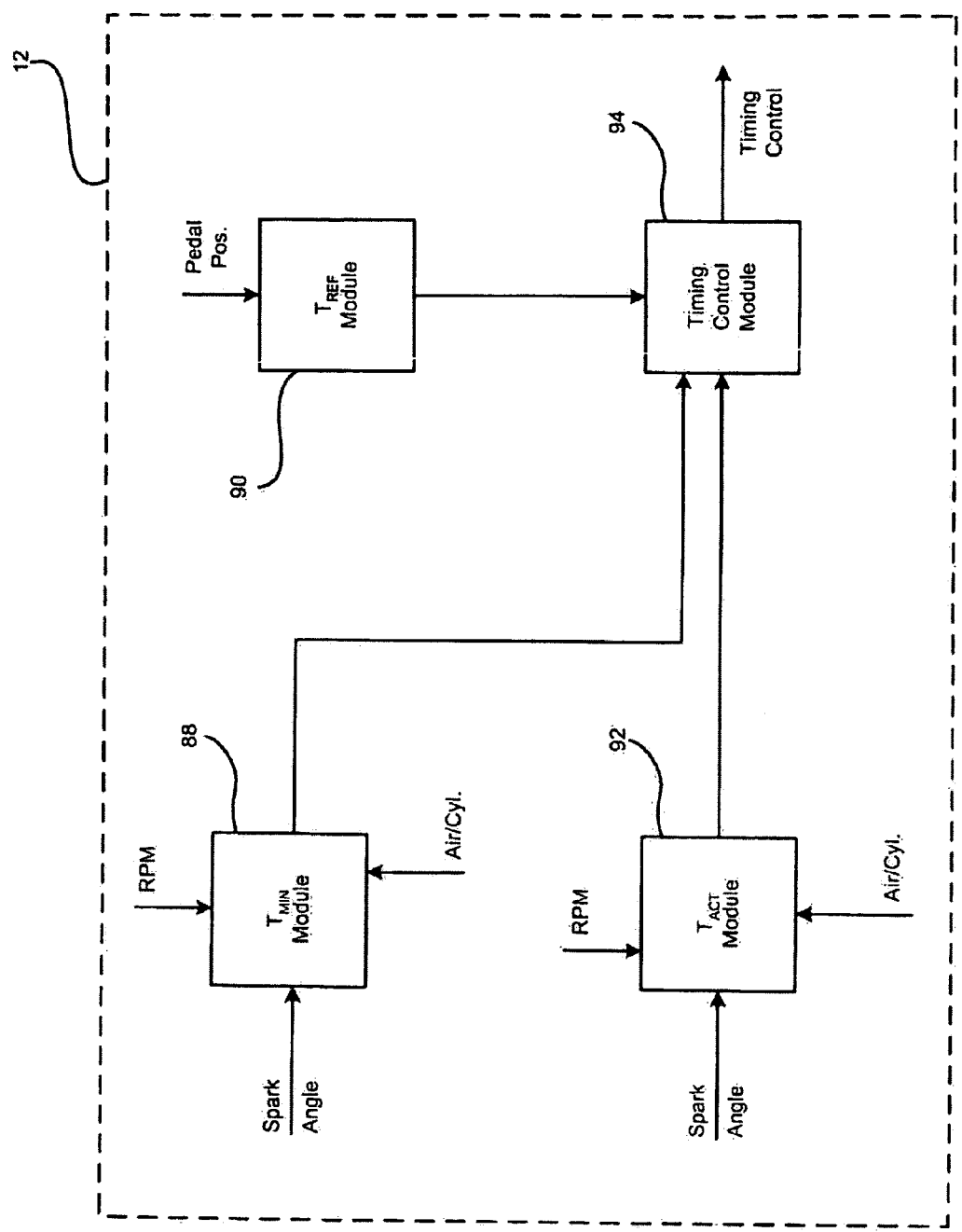
FIG. 3 is a logic diagram illustrating the NVH reducing control.

With reference now to FIGS. 3 and 4, a control method 110 for reducing NVH according to an embodiment of the present invention will be described in further detail. As depicted in FIG. 3, the control module 12 may include a $T_{Min}$ module 88, a $T_{Ref}$ module 90, a $T_{Actual}$ module 92 and a timing control module 94. Control begins in step 112. In step 116 control calculates torque variables $T_{Min}$, $T_{Actual}$ and $T_{Ref}$. More specifically, $T_{Min}$ is a minimum torque necessary to light the engine 14. $T_{Min}$ may be estimated based on engine speed (RPM), current spark angle, and air per cylinder through a lookup table. $T_{Actual}$ is a current output torque provided by the engine 14. $T_{Actual}$ may be estimated based on engine speed (RPM), current spark angle, and air per cylinder through a lookup table. $T_{Ref}$ is a reference torque or a current torque desired by the driver. The $T_{Ref}$ may be estimated based on a signal communicated by the accelerator pedal sensor 40. The timing control module 94 receives an output from the $T_{Min}$, $T_{Actual}$ and $T_{Ref}$ modules 88, 90 and 92, respectively and generates a timing control output.

In step 120, control determines if desired operating conditions exist. For example, control determines if the engine coolant is less than a calibration or if the battery storage level of the electrical storage 66 is less than a calibration. If yes, the mechanism 76 is deactivated in step 142, the engine 14 is started in step 124 and control ends in step 126. If not, the motor generator 62 and the electric storage 66 are sufficient to power the vehicle. As a result, the timing mechanism 76 is activated and the fuel supply to the engine 14 is stopped in step 130. In step 132, control determines if $T_{Ref}$ is less than $T_{Min}$. If yes, then $T_{Ref}$ is set equal to $T_{Min}$ in step 136. If not, control determines if $T_{Actual}$ is less than or equal to $T_{Ref}$ plus a calibration in step 140. If yes, the timing mechanism 76 is deactivated in step 142 and the engine is started in step 124. If not, control ends in step 126.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for a vehicle having a combustion engine and an electric propulsion system, said combustion engine including a camshaft and a crankshaft, said control system comprising:
   a first control module that generates a minimum torque;
   a second control module that generates an actual torque;
   a third control module that generates a reference torque; and
   a timing control module that generates a timing control output based on said minimum torque, said actual torque and said reference torque.

2. The control system of claim 1 wherein said minimum torque is based on an RPM of said combustion engine, a spark angle and an air per cylinder of said combustion engine.

3. The control system of claim 1 wherein said actual torque is based on an RPM of said combustion engine, a spark angle and an air per cylinder of said combustion engine.

4. The control system of claim 1 wherein said reference torque is based on an output of a pedal position sensor communicating with said control module in said vehicle.

5. The control system of claim 1 wherein said control module compares said actual torque to said reference torque and wherein said control module enables fuel to said combustion engine based on said comparison.

6. The control system of claim 5, further comprising a timing mechanism connected to said camshaft and wherein said control module activates said timing mechanism to operate said camshaft at a substantially equal speed of said crankshaft.

7. The control system of claim 6 wherein said control module deactivates said timing mechanism based on said actual output torque being less than said reference torque.

8. The control system of claim 7 wherein said control module sets said reference torque equal to said minimum torque if said reference torque is greater than said minimum torque.

* * * * *